(12) United States Patent
Tomlin et al.

(10) Patent No.: US 10,528,414 B2
(45) Date of Patent: Jan. 7, 2020

(54) CENTRALIZED ERROR HANDLING IN APPLICATION SPECIFIC INTEGRATED CIRCUITS

(71) Applicant: Toshiba Memory Corporation, Minato-ku, Tokyo (JP)

(72) Inventors: Andrew John Tomlin, San Jose, CA (US); Justin Cree Jones, Burlingame, CA (US)

(73) Assignee: Toshiba Memory Corporation, Tokyo (JP)

( * ) Notice: Subject to any disclaimer, the term of this patent is extended or adjusted under 35 U.S.C. 154(b) by 142 days.

(21) Appl. No.: 15/702,853

(22) Filed: Sep. 13, 2017

(65) Prior Publication Data

US 2019/0079824 A1     Mar. 14, 2019

(51) Int. Cl.
*G06F 11/00*     (2006.01)
*G06F 11/07*     (2006.01)

(52) U.S. Cl.
CPC ...... *G06F 11/0784* (2013.01); *G06F 11/0751* (2013.01); *G06F 11/0793* (2013.01)

(58) Field of Classification Search
CPC .... G06F 3/0659; G06F 11/00; G06F 11/0793; G06F 11/3055; G06F 12/0891; G06F 9/3865; G06F 9/4881; G06F 9/5011; H04L 49/90; H04L 51/30
See application file for complete search history.

(56) References Cited

U.S. PATENT DOCUMENTS

| | | | | |
|---|---|---|---|---|
| 5,278,984 A | * | 1/1994 | Batchelor | ............... H04L 51/26 |
| | | | | 719/314 |
| 5,687,390 A | * | 11/1997 | McMillan, Jr. | ........ G06F 3/0601 |
| | | | | 710/5 |
| 6,829,697 B1 | * | 12/2004 | Davis | .................. G06F 15/7864 |
| | | | | 712/21 |
| 7,151,744 B2 | | 12/2006 | Sarkinen et al. | |
| 7,308,700 B1 | | 12/2007 | Fung et al. | |
| 7,720,928 B2 | | 5/2010 | Reuter et al. | |
| 7,739,556 B1 | | 6/2010 | Duluk, Jr. et al. | |
| 7,756,053 B2 | | 7/2010 | Thomas et al. | |

(Continued)

OTHER PUBLICATIONS

Extended European Search Report dated Feb. 13, 2019 cited in corresponding European application No. 18190922.7.

*Primary Examiner* — Loan L. T. Truong
(74) *Attorney, Agent, or Firm* — White & Case LLP

(57) ABSTRACT

In one embodiment, a system comprises a plurality of hardware blocks, each of the plurality of hardware blocks configured to perform a function in response to a request associated with a command, an error queue manager configured to receive an error message from at least one of the plurality of hardware blocks and store the error message in an error queue, the error message including a command identifier of a command in error, and an error state manager including an error state bitmap, the error state bitmap storing an error state bit for each of a plurality of command identifiers, the error state bit indicating either command in error or command not in error; the error state manager configured to set the error state bit for the command identifier of the command in error to indicate command in error in response to an error state message, the error state message including the command identifier of the command in error.

23 Claims, 7 Drawing Sheets

(56) References Cited

U.S. PATENT DOCUMENTS

| | | | |
|---|---|---|---|
| 7,849,259 B1* | 12/2010 | Wong | G06F 3/061 710/53 |
| 8,095,829 B1 | 1/2012 | Coon et al. | |
| 8,351,426 B2* | 1/2013 | Cadigan, Jr. | H04L 47/13 370/389 |
| 8,713,357 B1* | 4/2014 | Jean | G06F 11/0727 714/6.1 |
| 9,015,533 B1 | 4/2015 | Fateev | |
| 9,497,025 B2* | 11/2016 | Alsup | H04L 49/25 |
| 10,061,780 B2* | 8/2018 | Kalal | G06F 16/183 |
| 10,102,084 B1* | 10/2018 | Reynolds | G06F 11/1004 |
| 10,210,095 B2* | 2/2019 | Bubb | G06F 12/10 |
| 10,216,668 B2* | 2/2019 | Wang | G06F 13/36 |
| 2002/0156894 A1* | 10/2002 | Suorsa | G06F 8/61 709/226 |
| 2008/0141256 A1* | 6/2008 | Forrer, Jr. | G06F 3/061 718/103 |
| 2008/0148282 A1* | 6/2008 | Sodani | G06F 9/3857 719/314 |
| 2010/0228706 A1* | 9/2010 | Labuda | G06F 16/2379 707/700 |
| 2012/0239973 A1* | 9/2012 | Walton | G06F 11/0712 714/15 |
| 2013/0091388 A1* | 4/2013 | Gygi | G06F 11/366 714/39 |
| 2013/0159764 A1* | 6/2013 | Adar | G06F 11/0745 714/5.1 |
| 2015/0089287 A1* | 3/2015 | Jayakumar | G06F 1/30 714/23 |
| 2015/0186068 A1* | 7/2015 | Benisty | G06F 3/0673 711/154 |
| 2015/0212738 A1* | 7/2015 | D'Eliseo | G06F 3/0659 711/154 |
| 2015/0234601 A1* | 8/2015 | Tsai | G06F 3/0611 711/103 |
| 2015/0254121 A1* | 9/2015 | Anderson | G06F 11/0706 714/37 |
| 2016/0248628 A1* | 8/2016 | Pandit | H04L 41/0806 |
| 2016/0371034 A1* | 12/2016 | Kang | G06F 3/0656 |
| 2017/0177247 A1* | 6/2017 | Hu | G06F 3/061 |
| 2017/0286337 A1* | 10/2017 | Wang | G06F 13/36 |
| 2018/0063100 A1* | 3/2018 | Peeters | H04L 63/02 |
| 2018/0300064 A1* | 10/2018 | McGlaughlin | G06F 13/4282 |
| 2018/0314657 A1* | 11/2018 | Chen | G06F 13/32 |
| 2019/0012269 A1* | 1/2019 | Bubb | G06F 12/10 |
| 2019/0079817 A1* | 3/2019 | Tomlin | G06F 11/1441 |
| 2019/0079824 A1* | 3/2019 | Tomlin | G06F 11/0784 |

* cited by examiner

US 10,528,414 B2

CENTRALIZED ERROR HANDLING IN APPLICATION SPECIFIC INTEGRATED CIRCUITS

FIELD OF THE INVENTION

The invention relates generally to application specific integrated circuits and more specifically to centralized error handling in application specific integrated circuits.

BACKGROUND OF THE INVENTION

Modern application specific integrated circuits (ASICs) such as System-on-Chip (SoC) devices commonly need to operate at very high data rates. To achieve such high speed operation ASIC designs often include sophisticated hardware automation in addition to firmware running on a processor. One example of an ASIC with a high level of hardware automation is a memory controller in a non-volatile solid-state memory drive. In devices with a high level of hardware automation, errors in executing commands from an external host should be handled in a manner such that the command in error has limited to no impact on other commands. Common error handling schemes involve interrupts sent to the device's firmware and halting operation of the hardware block experiencing the error, or passing errors between hardware blocks, which results in significant complexity in the ASIC design. Such error handling schemes also create opportunities for one hardware block experiencing an error in a command to "back pressure" other hardware blocks involved in executing tasks associated with that same command. For example, if a hardware block halts operation because of a command that experienced an error, completion of all other commands that require a task to be completed by that hardware block will be delayed until the error is cleared, causing a latency spike.

Typically, each hardware block that experiences an error will be held in an "error state" until the error is cleared by the firmware. If two hardware blocks are in an error state at the same time, both of those hardware blocks will cause back pressure in the system, a multi-error corner case. Error handling schemes designed to deal with such corner cases add significant complexity to both the system's hardware and firmware. This complexity requires significant verification tests of the system's design before manufacturing, which can delay the time to market for the system. Thus there is a long-felt need for an improved technique for error handling in ASICs.

BRIEF DESCRIPTION OF THE INVENTION

In one embodiment, a system comprises a plurality of hardware blocks, each of the plurality of hardware blocks configured to perform a function in response to a request associated with a command, an error queue manager configured to receive an error message from at least one of the plurality of hardware blocks and store the error message in an error queue, the error message including a command identifier of a command in error, and an error state manager including an error state bitmap, the error state bitmap storing an error state bit for each of a plurality of command identifiers, the error state bit indicating either command in error or command not in error; the error state manager configured to set the error state bit for the command identifier of the command in error to indicate command in error in response to an error state message, the error state message including the command identifier of the command in error.

In one embodiment, each of the plurality of hardware blocks is configured to send a query to the error state manager to determine the error state of a command prior to performing a function in response to a request associated with the command, and to disregard a request to perform a function associated with a command in error. In one embodiment, the system further comprises firmware configured to retrieve the error message from the error queue in the error queue manager and to identify a resource in at least one of the plurality of hardware blocks allocated to a request including the command identifier of the command in error, and to instruct the at least one of the plurality of hardware blocks to release the resource allocated to the request including the command identifier of the command in error.

In one embodiment, a method comprises receiving an error message in an error queue manager from one of a plurality of hardware blocks, the error message including a command identifier, storing the error message in an error queue, causing an error state manager to set an error state bit in an error state bitmap corresponding to the command identifier as command in error, reporting presence of the error message in the error queue to firmware, identifying at least one resource associated with the command identifier in a second one of the plurality of hardware blocks by the firmware, and causing the second one of the plurality of hardware blocks to release the at least one resource associated with the command identifier. In one embodiment, the method further comprises reporting the error state of a command in response to a query from one of the plurality of hardware blocks, if the error state of the command is command in error, disregarding a request associated with the command, and if the error state of the command is command not in error, performing a function in response to the request associated with the command. In one embodiment, the method further comprises causing the error state manager to set the error state bit in an error state bitmap corresponding to the command identifier as command not in error when at least one resource associated with the command identifier has been released.

DETAILED DESCRIPTION OF THE INVENTION

Figure 1:
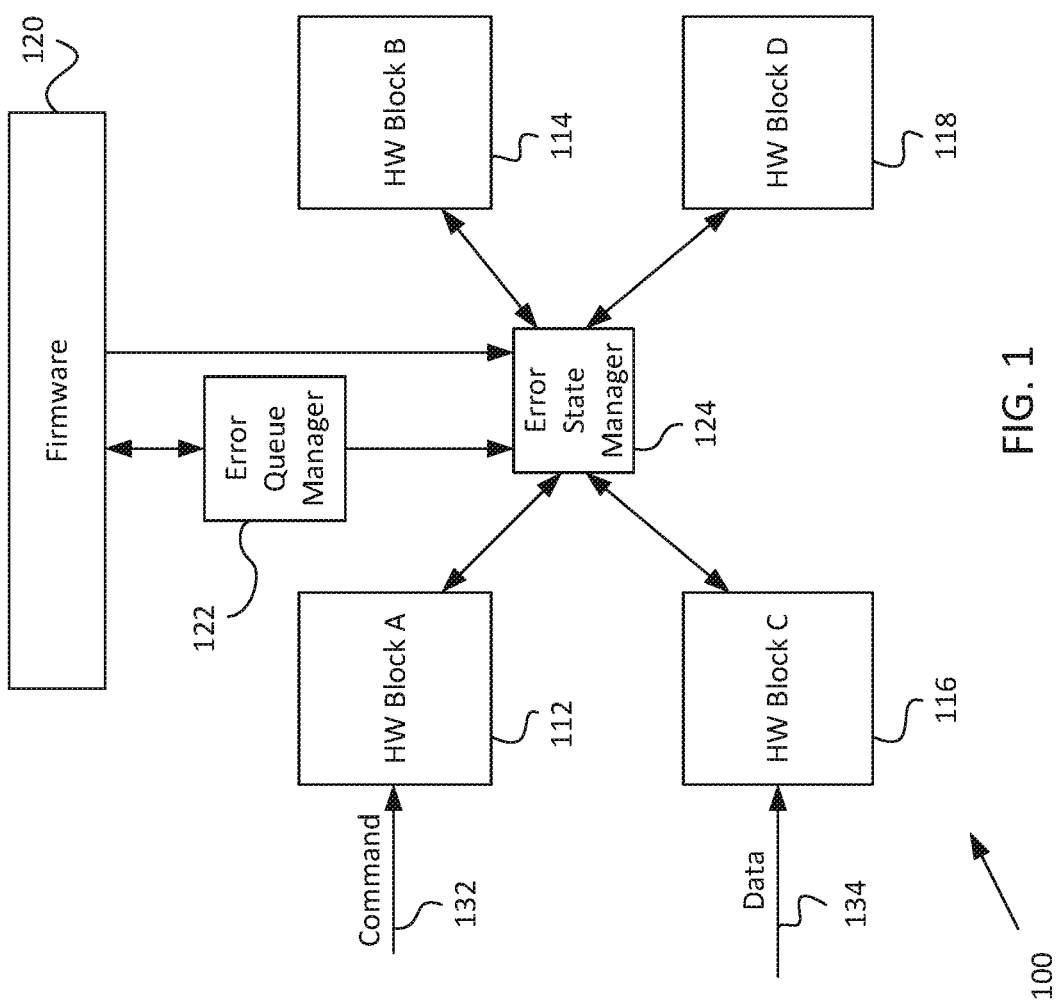
FIG. 1 is a diagram of one embodiment of an application specific integrated circuit with centralized error handing, according to the invention.

FIG. 1 is a diagram of one embodiment of an application specific integrated circuit (ASIC) 100 with centralized error handing, according to the invention. ASIC 100 comprises, but is not limited to, a hardware block A 112, a hardware block B 114, a hardware block C 116, a hardware block D 118, firmware 120, an error queue manager 122, and an error state manager 124. ASIC 100 includes a command path 132 for commands and command-related requests exchanged between hardware blocks and a data path 134 for data exchanged between hardware blocks. All of the communication paths between blocks in ASIC 100 are not shown in FIG. 1 for ease of illustration. Firmware 120 is executable code stored in a read-only memory (not shown) that is executed by a processing unit (not shown) in conjunction with a volatile memory (not shown). Each of hardware block A 112, hardware block B 114, hardware block C 116, and hardware block D 118 is a hardware state machine that performs a specific task or function, for example direct memory access, queuing commands, or error correction coding. Four hardware blocks 112, 114, 116, and 118 are shown in FIG. 1 for ease of illustration; an ASIC 100 including any number of hardware blocks is within the scope of the invention. In addition, error queue manager 122 and error state manager 124 may be implemented as hardware state machines.

Each of hardware block A 112, hardware block B 114, hardware block C 116, and hardware block D 118 performs a task or function in response to requests associated with a command identifier for a command from a host system (not shown). If one of the hardware blocks, for example hardware block C 116, experiences an error in handling a request, hardware block C 116 reports the error to error queue manager 122 by sending an error message. The error message includes a block identifier for hardware block C 116, the command identifier to identify the command associated with the request that experienced the error (i.e., the errored command), and any other appropriate information related to the error. After sending the error message to error queue manager 122, hardware block C 116 releases all state related to the errored command and begins handling the next request. By including all information related to an error in an error message to error queue manager 122, releasing all state associated with a command in error, and then proceeding with a next request, none of hardware block A 112, hardware block B 114, hardware block C 116, and hardware block D 118 "back pressures" any other hardware block in ASIC 100 by delaying handling of requests associated with other commands.

Error queue manager 122 sends an interrupt to firmware 120 when error queue manager 122 moves an error message into the top (the head) of the error queue. Error queue manager 122 sends a "command in error" state message to error state manager 124 that causes error state manager 124 to set an error state for that command identifier in an error state bitmap as being in error. In another embodiment, the hardware block experiencing the error, for example hardware block C 116, sends a "command in error" state message to error state manager 124 that causes error state manager 124 to set an error state for that command identifier as being in error in the error state bitmap. Firmware 120 retrieves error information from error queue manager 122 and identifies the command that is in error. Firmware 120 then performs a "cleanup" process to identify and release resources in other hardware blocks related to executing the errored command. For example, hardware block A 112 may have resources such as registers storing state information for a request related to the command that experienced an error in hardware block C 116. Firmware 120 will instruct hardware block A 112 to release any resources allocated to processing a request associated with the errored command. The released resources are then available for use in handling requests associated with other commands that are not in error. When the "cleanup" process is complete, firmware 120 sends a "clear error" message to error state manager 124 to set the error state of the command identifier as being not in error.

The error state bitmap in error state manager 124 includes an error state bit for each command identifier that can be assigned to a command in ASIC 100. When a hardware block, for example hardware block A 112, receives a request to perform a task from firmware 120 or another hardware block on a functional interface, hardware block A 112 first checks the error state for the command identifier associated with that request by sending a query to error state manager 124. If error state manager 124 responds with a message that the command is in error, hardware block A 112 ignores the request associated with the command and moves on to query the error state of the next request it receives. If error state manager 124 responds with a message that the command is not in error, the hardware block A 112 handles the request. By checking the error state for the command associated with every incoming request on its functional interface before attempting to handle the request, and dropping requests associated with commands reported as being in error by error state manager 124, each of hardware block A 112, hardware block B 114, hardware block C 116, and hardware block D 118 avoids becoming "infected" with a command that previously experienced an error in another hardware block. Thus none of hardware block A 112, hardware block B 114, hardware block C 116, and hardware block D 118 wastes resources handling requests associated with a command reported to be in error.

Figure 2:
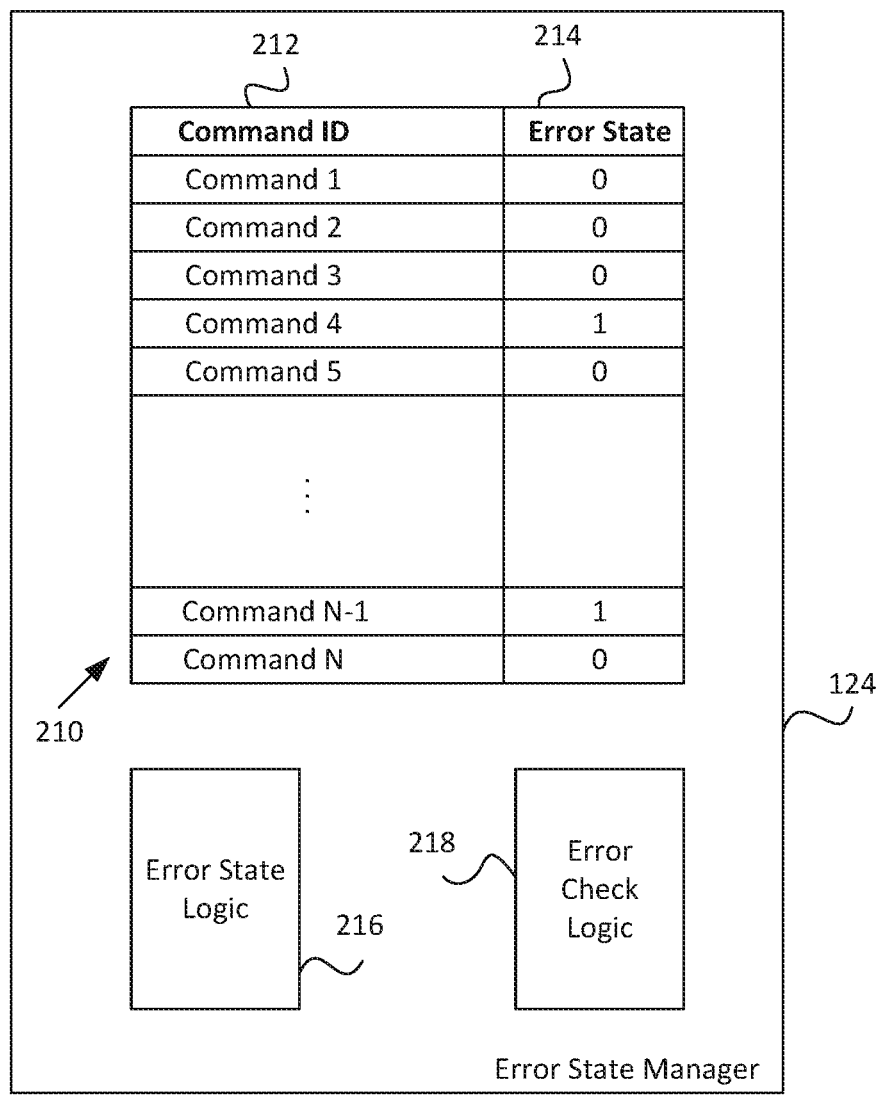
FIG. 2 is a diagram of one embodiment of the error state manager of FIG. 1, according to the invention.

FIG. 2 is a diagram of one embodiment of the error state manager 124 of FIG. 1, according to the invention. Error state manager 124 includes but is not limited to an error state bitmap 210 having a command identifier (command ID) index 212 and an error state field 214, an error state logic 216, and an error check logic 218. Error state bitmap 210 includes a number of rows equal to the number (N) of possible command identifiers used in ASIC 100. An error state bit in error state field 214 represents the error state of each command. In the FIG. 2 embodiment, an error state bit with a logic value of "0" means that the command is not in error and an error state bit with a logic value of "1" means that the command is in error. In the FIG. 2 embodiment, command 4 and command N−1 have an error state of "in error." Error state manager 124 receives "command in error" state messages from error queue manager 122 to mark a command as being in error, where each message includes a command identifier. In another embodiment, error state manager 124 receive a "command in error" state message from any of hardware block A 112, hardware block B 114, hardware block C 116, and hardware block D 118 when that hardware block experiences an error in performing a task associated with a command identifier. In one embodiment, error state manager 124 includes a register interface (not shown) that enables firmware 120 to set the error state of a command. For example, firmware 120 may abort a command and set the error state of that command in error state bitmap 210 as being in error. In response to a "command in error" state message, error state logic 216 sets the error state bit in error state field 214 for the specified command identifier as being in error, for example by setting the bit to a logic value of "1." Error state manager 124 receives "clear error" messages from firmware 120 to mark the specified command as no longer being in error. In response to a "clear error" message, error state logic 216 sets the error state bit in error state field 214 for the command identifier specified in the "clear error" message as not being in error, for example by setting the bit to a logic value of "0."

Error state manager 124 is also configured to receive "check error" queries from hardware block A 112, hardware block B 114, hardware block C 116, and hardware block D 118 seeking the error state of a particular command. When error state manager 124 receives a query from one of hardware block A 112, hardware block B 114, hardware block C 116, or hardware block D 118, error check logic 218 reads the error state in error state field 214 for the command identifier specified in the query. Error check logic 218 then sends a response to the requesting hardware block that includes the command identifier and the current error state. This response enables the hardware blocks to avoid processing requests associated with commands reported to error queue manager 122 as being in error.

Figure 3:
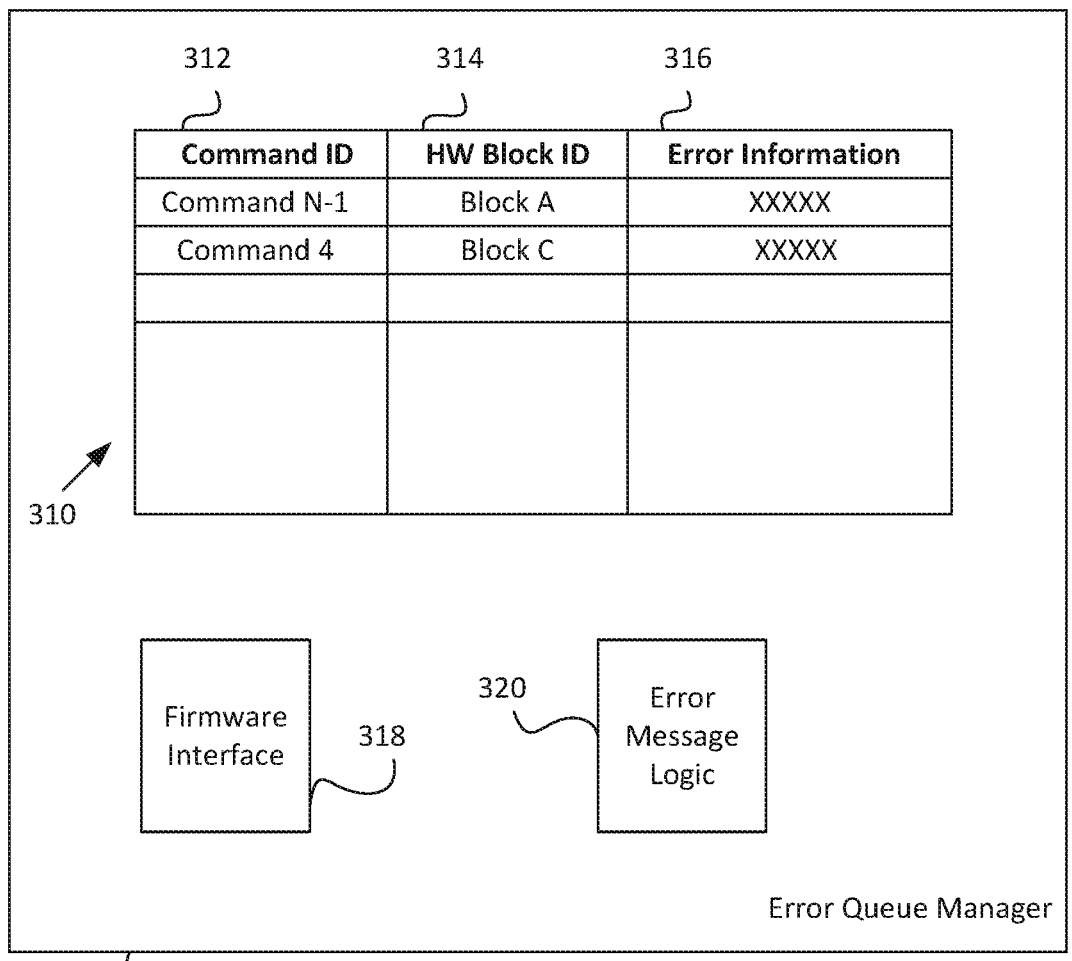
FIG. 3 is a diagram of one embodiment of the error queue manager of FIG. 1, according to the invention.

FIG. 3 is a diagram of one embodiment of the error queue manager 122 of FIG. 1, according to the invention. Error queue manager 122 includes but is not limited to an error queue 310, a firmware interface 318, and an error message logic 320. In the FIG. 3 embodiment, error queue 310 includes but is not limited to a command identifier field 312, a hardware block identifier field 314, and an error information field 316. Error queue manager 122 provides an error messaging interface between firmware 120 and each of hardware block A 112, hardware block B 114, hardware block C 116, and hardware block D 118. Error queue manager 122 receives an error message from a hardware block that experiences an error via error message logic 320. An error message includes a hardware block identifier for the hardware block that experienced the error, a command identifier of the command that is in error, and other error state information related to the command. The content and format of the error state information depend on the function performed by the hardware block that experienced the error. For example, a hardware block performing a direct memory access function will have different state information than a hardware block performing a numerical calculation function.

Error message logic 320 sends a "command in error" state message to error state manager 124 in response to an error message from a hardware block and stores the error message information in error queue 310. In the FIG. 3 embodiment, error queue 310 shows that hardware block A 112 reported an error in handling a request related to a command N−1 and hardware block C 116 reported an error in handling a request related to a command 4. As shown in FIG. 2, command 4 and command N−1 have an error state of "1," command in error. Error message logic 320 stores error message information in error queue 310 in the order that the error messages were received. When an error message is moved to the top of error queue 310, firmware interface 318 sends an interrupt to firmware 120 to inform firmware 120 that a command has experienced an error, and firmware 120 will fetch the error information for that command from error queue manger 122. In one embodiment, error queue 310 is a buffer with a head and a tail. Error message logic 320 writes each received error message to the tail of error queue 310 and firmware 120 reads an error message from the head of error queue 310. After firmware 120 has processed an error message, firmware 120 writes to a head register (not shown) to update the location of the head in error queue 310. Firmware 120 performs a "cleanup" process in which it identifies resources in other hardware blocks that have been allocated to requests related to the command in error and instructs those hardware blocks to release those resources. Firmware 120 then handles the error information in any appropriate fashion, for example by reporting the error to a host system and/or resubmitting the command for execution.

Figure 4:
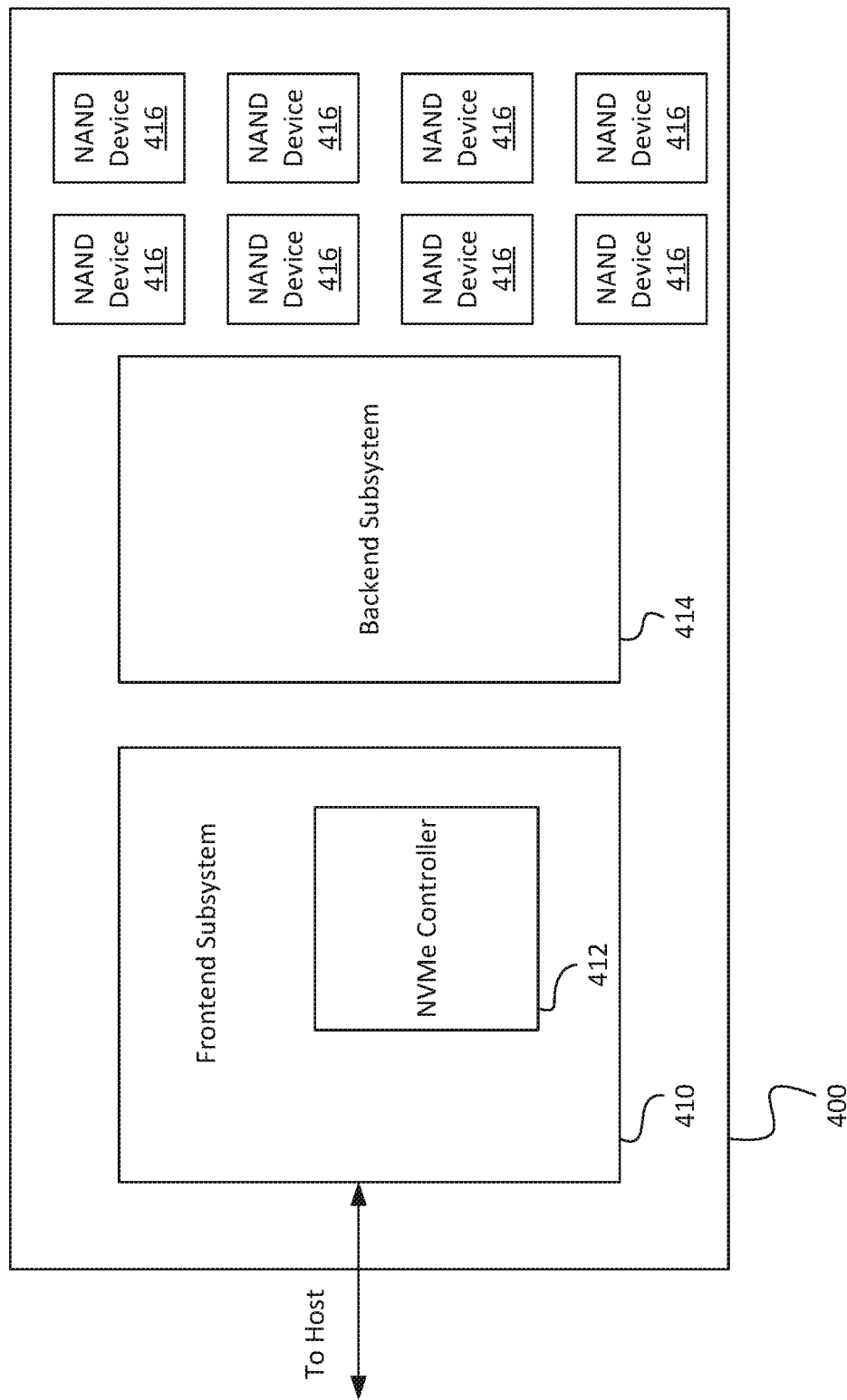
FIG. 4 is a diagram of one embodiment of a solid state storage drive including a controller with centralized error handling, according to the invention.

FIG. 4 is a diagram of one embodiment of a solid state storage drive 400 including a controller with centralized error handling, according to the invention. Solid state storage drive 400 includes, but is not limited to, a frontend subsystem 410, a backend subsystem 414, and a plurality of NAND flash memory devices 416. Frontend subsystem 410 provides an interface with host systems (not shown) and backend subsystem 414 provides an interface with NAND flash memory devices 416. In the FIG. 4 embodiment, solid state storage drive 400 is a dual-host system where frontend subsystem 410 interfaces with two separate host systems to receive commands and data and to output data read from NAND devices 416. An NVM express (NVMe) controller 412 in frontend subsystem 410 translates commands received from the host systems that comply with the NVMe standard into a set of requests for backend subsystem 414 to cause data to be read from or written to NAND devices 416.

Figure 5:
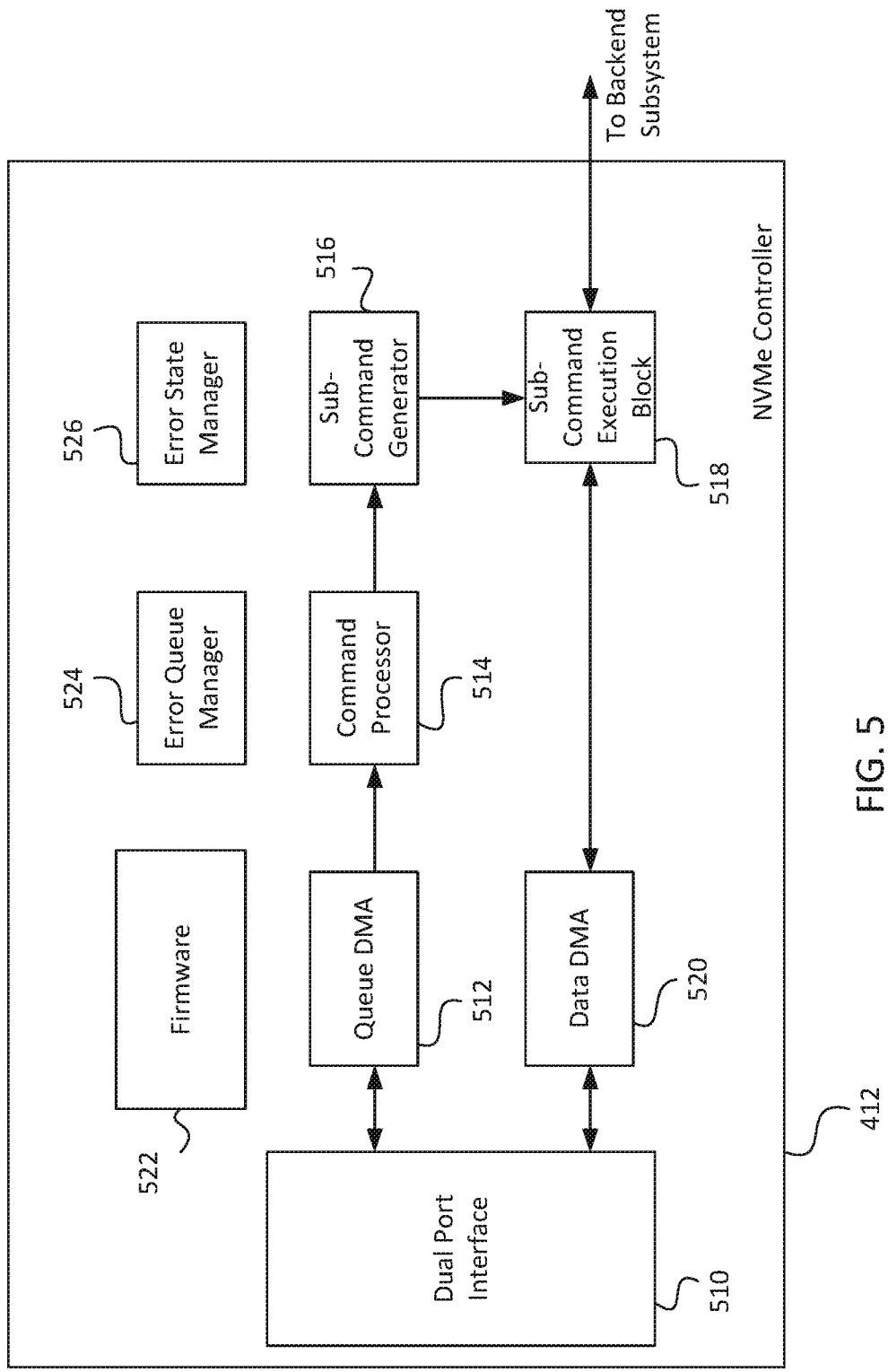
FIG. 5 is a diagram of one embodiment of the controller with centralized error handling of FIG. 4, according to the invention.

FIG. 5 is a diagram of one embodiment of NVMe controller 412 of FIG. 4, according to the invention. NVMe controller 412 is an ASIC that includes, but is not limited to, a dual port interface 510, a queue direct memory access (DMA) 512, a command processor 514, a subcommand generator 516, a subcommand execution block 518, a data DMA 520, a firmware 522, an error queue manager 524, and an error state manager 526. Firmware 522 is executable code stored in a read-only memory (not shown) that is executed by a processing unit (not shown) in conjunction with a volatile memory (not shown). Each of dual port interface 510, queue DMA 512, command processor 514, subcommand generator 516, subcommand execution block 518, and data DMA 520 is a hardware block configured to perform a specific task. Queue DMA 512 fetches host commands, such as read commands and write commands, through dual port interface 510 and sends the commands to command processor 514. Command processor 514 assigns a command identifier to each host command and sends the command identifier to firmware 522. Command processor 514 sends the command with its assigned command identifier to subcommand generator 516, which generates a set of subcommands (or requests) for the command. For example, if the command is a read command calling for 32 KB of data to be read from NAND devices 416, subcommand generator 516 will generate a set of read subcommands where each subcommand is configured to cause a portion of the 32 KB payload to be read from one of NAND devices 416. In one embodiment, subcommand generator 516 is configured to generate subcommands having data payloads of 4 KB each. So for the exemplary read command calling for 32 KB of data, subcommand generator 516 will generate 8 subcommands that are associated with the command identifier for the read command. Each subcommand includes a data tag that identifies that subcommand. Subcommand generator 516 sends the subcommands to subcommand execution block 518, which executes the subcommands to cause backend subsystem 414 to perform operations such as reading data from NAND devices 416. Subcommand execution block 518 uses the data tags to manage the processing of the subcommands. Subcommand execution block 518 sends data read from NAND devices 416 to data DMA 520, which provides the data to the requesting host system through dual port interface 510. Data DMA 520 also receives data to be written to NAND devices 416 from the host systems through dual port interface 510 and provides the data to subcommand execution block 518.

Upon receiving a request associated with a host command, each of queue DMA 512, command processor 514, subcommand generator 516, subcommand execution block 518, and data DMA 520 sends a query to error state manager 526 to ascertain the error state of the command associated with the request. Error state manager 526 includes an error state bitmap (not shown), and looks up the error state in the error state bitmap for the command identifier included in the query. Error state manager 526 responds to the query with a message including the current status of the error state for that command, either no error or in error. If error state manager 526 responds to the query that the command is not in error, the hardware block handles the request. If error state manager 526 responds to the query that the command is in error, the hardware block drops or ignores the request and moves on to the next request.

If any of queue DMA 512, command processor 514, subcommand generator 516, subcommand execution block 518, and data DMA 520 experiences an error in handling a request associated with a host command, the block experiencing the error sends an error message to error queue manager 524. The error message includes an identifier of the hardware block, for example an identifier for command processor 514, the command identifier for the command that experienced the error, and other applicable error information. After sending the error message, the block that experienced the error releases all state for that request and proceeds to handling its next incoming request. Error queue manager 524 stores the information in each error message in an error queue (not shown) and sends a "command in error" state message to error state manager 526. In another embodiment, the block experiencing the error sends a "command in error" state message to error state manager 526. Error state manager 526 then sets the error state for the command identifier as being in error in the error state bitmap. Error queue manager 524 sends an interrupt to firmware 522 to inform firmware 522 that a message is available, and firmware 522 will fetch the error information for that command from error queue manager 524.

Firmware 522 deals with the error information as appropriate and will then release resources allocated to the command in error and report the error to the requesting host system if necessary. Firmware 522 identifies resources in other hardware blocks that have been allocated to requests related to the command in error and instructs those hardware blocks to release those resources. For example, firmware 522 will delete the command in error from an execution queue of command processor 514 and scan a data tag table of subcommand execution block 518 to identify any data tags associated with the command identifier of the command in error. Firmware 522 will then send instructions to data DMA 520 and subcommand execution block 518 to free all data tags associated with the command in error. Once all data tags associated with the command in error have been freed, firmware 522 instructs data DMA 520 to deallocate any residual data pointers associated with the command in error. When all resources related to the command in error have been released, firmware 522 sends a "clear error" message to error state manager 526 to change the error state of the command to "not in error." Firmware 522 may also instruct command processor 514 to mark the command identifier for the now-cleared command as available or free, such that the command identifier can be assigned to a new command received from the host systems. Alternatively, firmware 522 reports the error to the host system that issued the command. In one embodiment, firmware 522 sends a command completion message to a completion queue of the requesting host system, where the completion message includes an error code. Firmware 522 sending a completion message will also free the command identifier. In one embodiment, firmware 522 is configured to send command completion messages to a completion queue of the requesting host that comply with the NVMe protocol.

Figure 6:
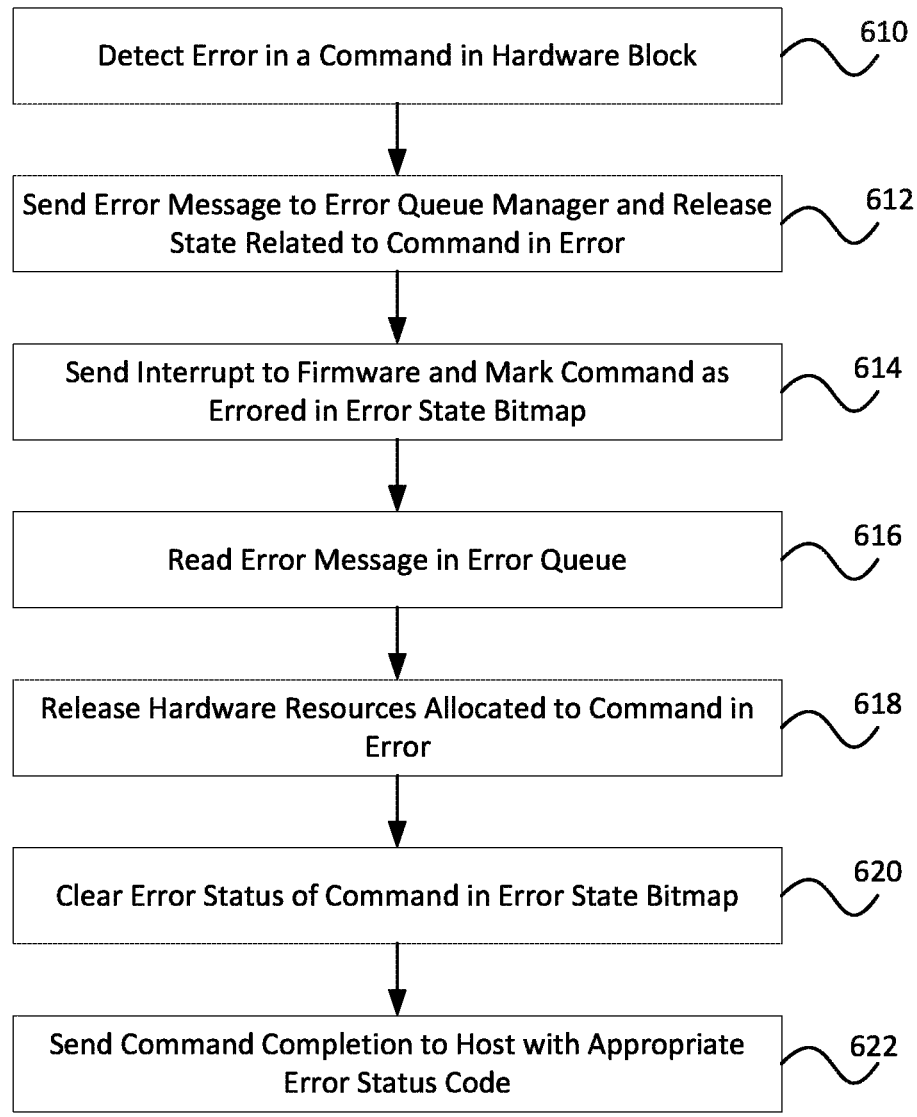
FIG. 6 is a flowchart of method steps for centralized error handling in an application specific integrated circuit, according to one embodiment of the invention.

FIG. 6 is a flowchart of method steps for centralized error handling in an application specific integrated circuit such as NVMe controller 412, according to one embodiment of the invention. In step 610, a hardware block, for example subcommand execution block 518 of NVMe controller 412 of FIG. 5, detects an error in a command being handled by that block. In a step 612, the hardware block experiencing the error sends an error message to error queue manager 524, the error message including a command identifier for the command in error, an identifier for the hardware block experiencing the error, and other error information. The format and content of the other error information will vary according to the function the hardware block experiencing the error is configured to perform. The hardware block experiencing the error also releases all state related to the command in error and then proceeds to handle the next incoming request. In step 614, error queue manager 524 sends an interrupt to firmware 522 to notify firmware 522 that an error has occurred and sends a "command in error" state message to error state manager 526, which sets the error state of the command in the error state bitmap as being in error. In another embodiment, the hardware block experiencing the error sends a "command in error" state message to error state manager 526. In one embodiment, error queue manager 524 sends an interrupt to firmware 522 when error queue manager 524 places a next error message at the head of the error queue. In step 616, firmware 522 reads the error message in the error queue of error queue manager 524. In a step 618, firmware 522 performs a "cleanup" process to release resources allocated to the command in error in other hardware blocks. One embodiment of this "cleanup" process is described below in conjunction with FIG. 7. When the cleanup process is complete, the method continues with step 620, in which firmware 522 sends a message to error state manager 526 to clear the error status of the command identifier in the error state bitmap. In other words, firmware 522 sends a "clear error" message to error state manager 526 to set the error status of the command identifier as being not in error. In step 622, firmware 522 sends a command completion message to a completion queue of the host system with an appropriate error status code.

Figure 7:
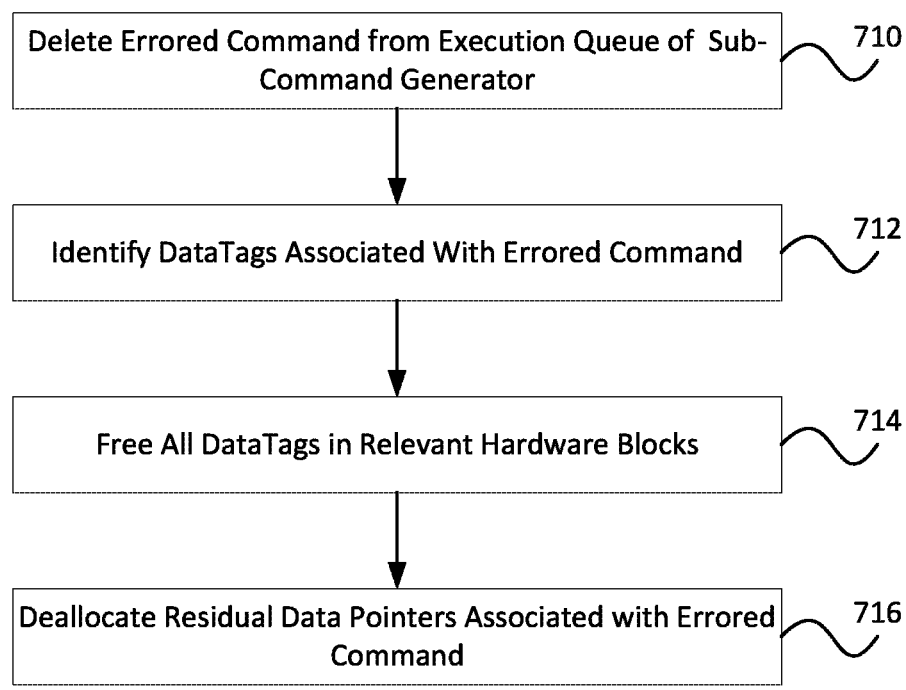
FIG. 7 is a flowchart of method steps for releasing hardware resources associated with an errored command, according to one embodiment of the invention.

FIG. 7 is a flowchart of method steps for releasing hardware resources associated with an errored command, according to one embodiment of the invention. In the FIG. 7 embodiment, firmware 522 performs a "cleanup" process to release hardware resource for a command that has experienced an error in one of the hardware blocks of NVMe controller 412 of FIG. 5. In step 710, firmware 522 deletes the errored command from the execution queue of subcommand generator 516. In step 712, firmware 522 identifies all data tags associated with the errored command by scanning a data tag table in subcommand execution block 518. In step 714, firmware 522 frees all the data tags associated with the errored command in the relevant hardware blocks. For example, firmware 522 instructs data DMA 520 and subcommand execution block 518 to free all data tags associated with the command in error. Once all data tags associated with the command in error have been freed, in step 716 firmware 522 instructs data DMA 520 to deallocate any residual data pointers associated with the errored command.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A system comprising:
a plurality of hardware blocks, each of the plurality of hardware blocks configured to perform a function in response to a request associated with a command;
an error queue manager configured to receive an error message from at least one of the plurality of hardware blocks and store the error message in an error queue, the error message including a command identifier of a command in error; and
an error state manager including an error state bitmap, the error state bitmap storing an error state bit for each of a plurality of command identifiers, the error state bit indicating either command in error or command not in error;
the error state manager configured to set the error state bit for the command identifier of the command in error to indicate command in error in response to an error state message, the error state message including the command identifier of the command in error.

2. The system of claim 1, wherein each of the plurality of hardware blocks is configured to send a query to the error state manager to determine the error state of a command prior to performing a function in response to a request associated with the command.

3. The system of claim 2, wherein each of the plurality of hardware blocks is configured to disregard a request to perform a function associated with a command in error.

4. The system of claim 1, wherein the error queue manager is further configured to send the error state message to the error state manager.

5. The system of claim 1, wherein each of the plurality of hardware blocks is further configured to send the error state message to the error state manager.

6. The system of claim 1, wherein each of the plurality of hardware blocks is configured to detect an error in performing the function associated with the request and send the error message to the error queue manager upon detection of the error.

7. The system of claim 6, wherein each of the plurality of hardware blocks is a state machine and is further configured to release all state related to the request after sending the error message to the error queue manager.

8. The system of claim 1, further comprising firmware configured to retrieve the error message from the error queue in the error queue manager and to identify a resource in at least one of the plurality of hardware blocks allocated to a request including the command identifier of the command in error.

9. The system of claim 8, wherein the firmware is further configured to instruct the at least one of the plurality of hardware blocks to release the resource allocated to the request including the command identifier of the command in error.

10. The system of claim 9, wherein the firmware is further configured to instruct the error state manager to set the error state bit in the error state bitmap for the command identifier as command not in error when all resources allocated to the request in the plurality of hardware blocks have been released.

11. The system of claim 1, wherein the error message further includes an identifier of the at least one of the plurality of hardware blocks.

12. The system of claim 1, wherein the error message further includes state information for the at least one of the plurality of hardware blocks.

13. A method comprising:
receiving an error message in an error queue manager from one of a plurality of hardware blocks, the error message including a command identifier;
storing the error message in an error queue;
causing an error state manager to set an error state bit in an error state bitmap corresponding to the command identifier as command in error;
reporting presence of the error message in the error queue to firmware;
identifying at least one resource associated with the command identifier in a second one of the plurality of hardware blocks by the firmware; and
causing the second one of the plurality of hardware blocks to release the at least one resource associated with the command identifier.

14. The method of claim 13, further comprising querying the error state manager to determine the error state of a command by one of the plurality of hardware blocks.

15. The method of claim 13, further comprising
reporting the error state of a command in response to a query from one of the plurality of hardware blocks;
if the error state of the command is command in error, disregarding a request associated with the command; and
if the error state of the command is command not in error, performing a function in response to the request associated with the command.

16. The method of claim 13, wherein causing an error state manager to set an error state bit in an error state bitmap corresponding to the command identifier as command in error comprises sending an error state message to the error state manager from either the error queue manager or the one of the plurality of hardware blocks.

17. The method of claim 13, further comprising causing the error state manager to set the error state bit in an error state bitmap corresponding to the command identifier as command not in error when the at least one resource associated with the command identifier has been released.

18. The method of claim 13, further comprising detecting an error in performing a function associated with the command identifier by the one of a plurality of hardware blocks and releasing all state information related to the error in the one of a plurality of hardware blocks.

19. The method of claim 13, wherein each of the plurality of hardware blocks is a state machine and is configured to release all state related to the command identifier after sending the error message to the error queue manager.

20. The method of claim 13, wherein the plurality of hardware blocks comprise an application specific integrated circuit, the application specific integrated circuit storing the firmware in a memory.

21. The method of claim 13, further comprising sending a command completion message to a host system, the command completion message including an error code.

22. The method of claim 13, wherein the error message further includes an identifier of the one of the plurality of hardware blocks.

23. The method of claim 13, wherein the error message further includes state information for the one of the plurality of hardware blocks.

* * * * *